Figure 1:
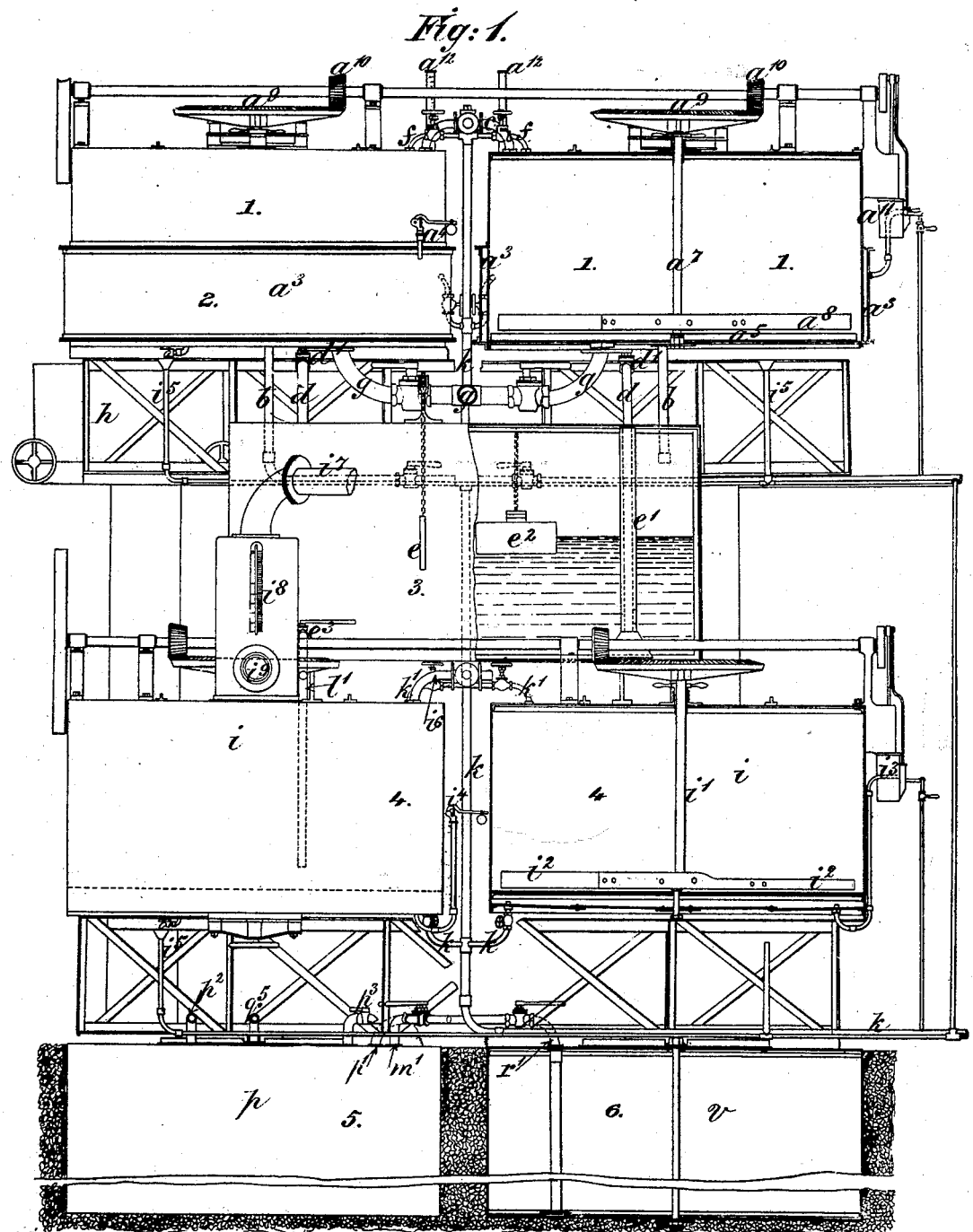

S. H. JOHNSON.
Method of and Apparatus for Separating Free Sulphur.
No. 166,279. Patented Aug. 3, 1875.
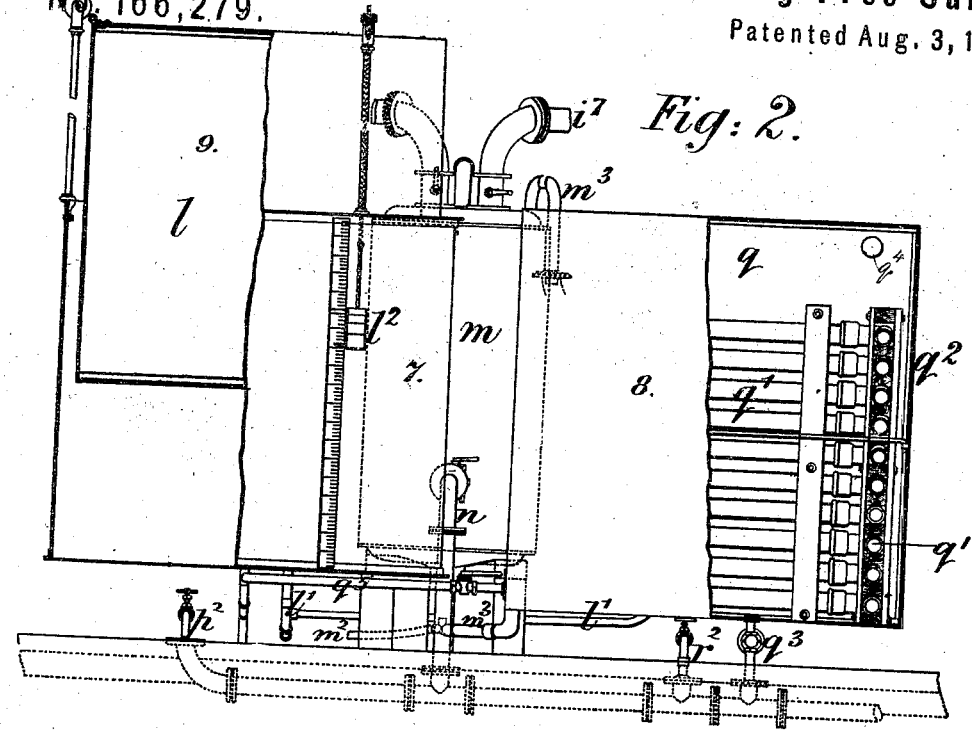
Fig. 2.
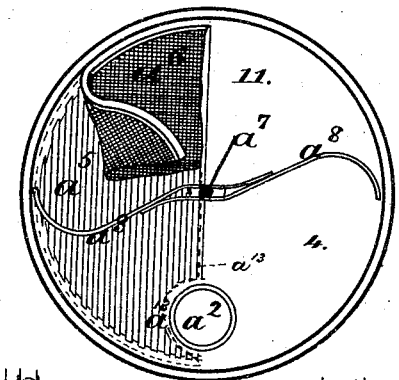
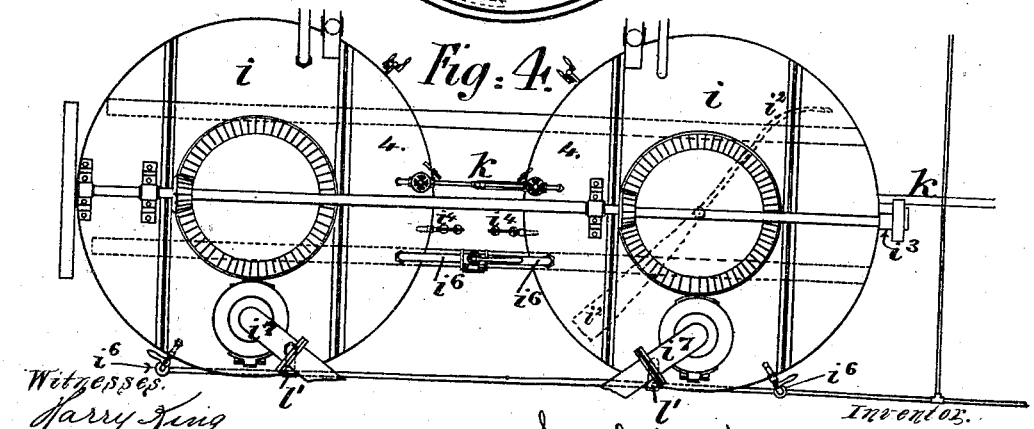
Fig. 4.
Witnesses:
Harry King
H. H. Young
Inventor:
Saml H. Johnson
by his attorney
Wm D. Baldwin

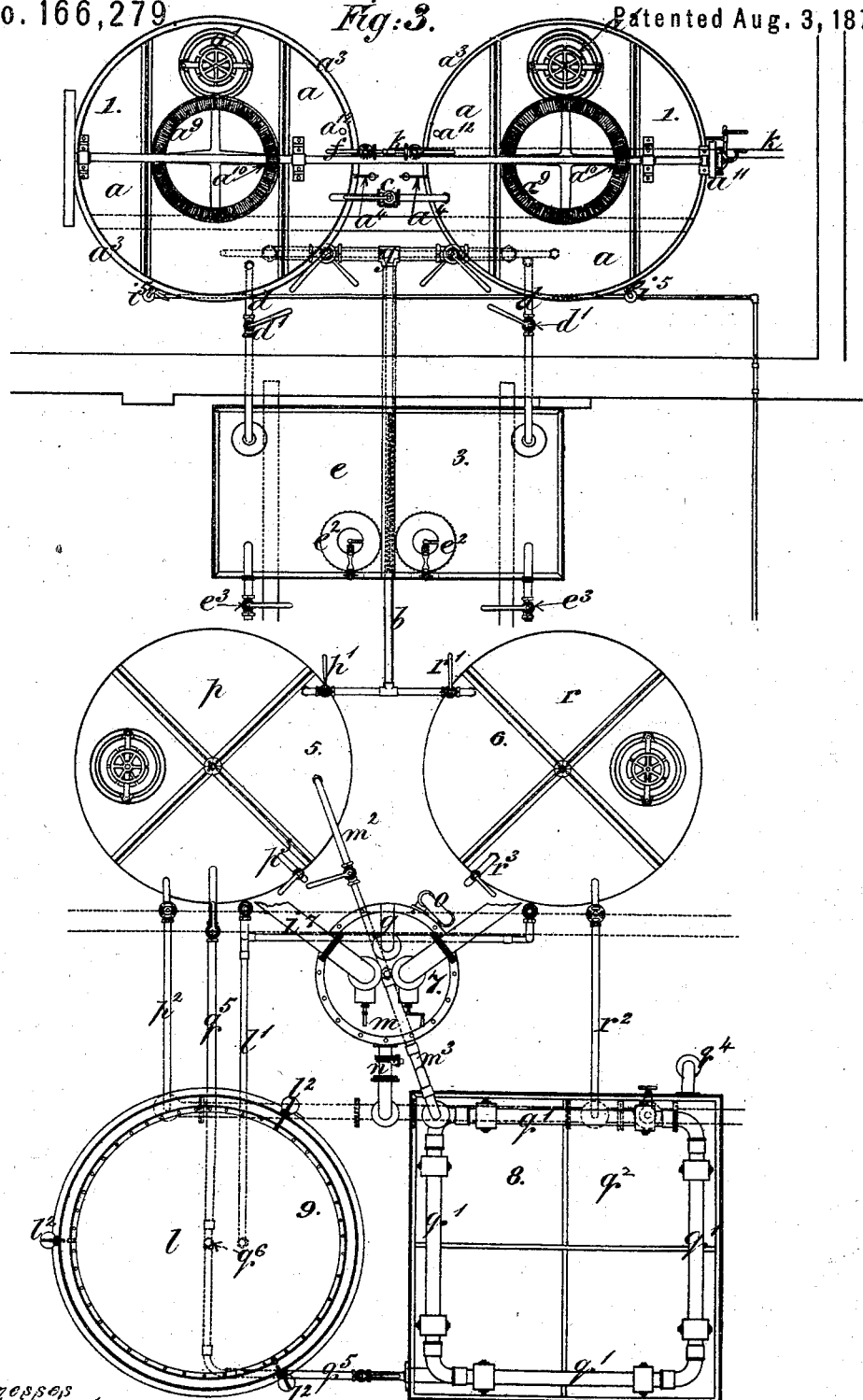

UNITED STATES PATENT OFFICE.

SAMUEL HENRY JOHNSON, OF LEA BANK WORKS, STRATFORD, ENGLAND.

IMPROVEMENT IN METHODS OF AND APPARATUS FOR SEPARATING FREE SULPHUR.

Specification forming part of Letters Patent No. 166,279, dated August 3, 1875; application filed July 13, 1874.

*To all whom it may concern:*

Be it known that I, SAMUEL HENRY JOHNSON, of Lea Bank Works, Stratford, in the county of Essex, England, a subject of the Queen of Great Britain, have invented or discovered new and useful improvements in the method of and apparatus for separating free sulphur from substances with which it is mixed; and I, the said SAMUEL HENRY JOHNSON, do hereby declare the nature of the said invention, and in what manner the same is to be performed, to be particularly described and ascertained in and by the following statement thereof—that is to say:

My invention consists of certain improvements in the method of and in apparatus used for separating sulphur, by means of the chemical agents hereinafter mentioned, from mixtures containing it in the free state, such as sulphur ore, or the material known as spent oxide of iron, and of the method of manipulating the agent employed in such a manner as to enable the desired result to be efficiently obtained without any undue loss of the chemical agents during the process. It will be found in practice that my improvements so facilitate the manipulation as to enable the process to be carried out to commercial advantage—an object which has not hitherto been successfully obtained. I effect the separation in the manner which I will now describe.

The chemical agent which I find may be most beneficially employed is bisulphide of carbon, and I proceed as follows: I take a suitable quantity of the material to be operated upon by any convenient means, and as this should be thoroughly dry, it is, where necessary, dried, and is brought to such a state of division as is requisite for the complete solution of the sulphur which is mixed with the material. I put it into a receptacle, which hereinafter is called the "extractor," provided with a filter of linen or cocoa fiber, matting, or other suitable porous material, on a perforated diaphragm or grating near the bottom. I then hermetically close the extractor. In the extractor I use an agitator, which stirs up the material in the manner hereinafter mentioned. Through a pipe in the bottom of the receptacle I then introduce as much bisulphide of carbon as is necessary to dissolve all the sulphur, taking care that an air-cock on the top of the extractor is open, so as to permit the air to be expelled from the receptacle. I next heat the contents of the extractor by means of a steam-jacket or liquid bath up to the boiling-point of bisulphide of carbon, keeping it in ebullition until the vapors arising therefrom shall have expelled the atmospheric air—an operation which should be made as carefully and completely as possible. When the bisulphide vapors begin to be evolved at the air-cock, I close it and continue the application of heat until a pressure of a few pounds to the square inch is indicated. I then draw off the solution of sulphur by means of a cock placed at the bottom of the extractor into an open cistern, in which a few inches depth of water is always kept, covering the solution in order to prevent evaporation. A pipe from the cock then delivers the sulphur solution beneath the level of the water. This cistern supplies a still provided with a condenser and suitable receiver, which I call the "pure-spirit receiver." I next introduce into the extractor sufficient bisulphide of carbon to wash out the remainder of the sulphur solution, and repeat the operation, if necessary. These washings are run into another receiver, which I call a "washings-receiver." In this case I use the washings for the first treatment of the next batch operated upon in the extractor, so that it is only necessary to evaporate the strong solution.

The sulphur solution obtained by the first treatment with bisulphide of carbon is then evaporated in the still, being heated by means of steam in a jacket on the bottom of the still, until all or nearly all the bisulphide of carbon is removed. The still is provided with blades or scrapers, which are kept revolving close to the bottom during the latter part of the distillation, so as to facilitate the evolution of the bisulphide of carbon by preventing the sulphur from forming a mass at the bottom of the still.

At the close of the process of distillation, I inject steam directly into the still, so as to expel the bisulphide-of-carbon vapor, and replace it with one of steam. I then open the still and remove the sulphur. The condensed bisulphide of carbon is available without deterioration for fresh operations.

In order to recover the bisulphide of carbon which remains in the residue of the material operated on which is left in the extractor, I inject steam at the top of the vessel, so as to permeate the material and displace and evaporate the bisulphide of carbon. The resulting vapors pass from the extractor into the condenser of the still by means of a pipe and cock connected therewith from the bottom of the extractor.

When the whole of the bisulphide of carbon has been vaporized and displaced by the steam, the extractor is opened and the residuum free from sulphur removed.

In order the more clearly to understand the nature of this invention, it is here necessary to explain that when bisulphide-of-carbon vapor is mixed with atmospheric air, the tension of the former is so considerable at ordinary temperatures that one volume of air will impart the characteristics of a permanent incondensable gas to two volumes of bisulphide-of-carbon vapor; consequently, if air were allowed to mix during the process with bisulphide-of-carbon vapor, the bisulphide of carbon so mixed would be irrecoverably lost, and would be carried away from the apparatus; and from the great density of the bisulphide-of-carbon vapor the loss would be considerable.

Under these circumstances it is expedient to permit as little air as possible to become mixed with the bisulphide-of-carbon vapor in the apparatus, and to eliminate therefrom as much as possible all the air-spaces. It is with this object that I introduce the bisulphide of carbon at the bottom of the extractor in the manner above described, so as to float the air out of it through the air-cock without admixture with the bisulphide-of-carbon vapor, and also displace the remainder of the air in the extractor by the vapor of the bisulphide of carbon produced by the application of heat to the extractor, as hereinbefore mentioned.

The high specific gravity of the bisulphide-of-carbon vapor permits of the expulsion of the air in an effectual and complete manner without admixture, excepting a very trifling amount at the close of the operation, and with the same object I also permit the temperature of the bisulphide of carbon in the extractor to be raised beyond the boiling-point, so as to drive out the solution of sulphur without permitting air to enter the apparatus.

It is also apparent that the subsequent washing above referred to may be effected without the necessity of opening the air-cock, for the bisulphide-of-carbon vapor will condense on cooling, thus producing a partial vacuum, by means of which the quantity of bisulphide of carbon sufficient for the purpose is introduced. With the same object any incondensable vapors passing through the condenser are conducted by means of a pipe into an ordinary gas-holder, free communication with which is permitted to obtain through the condenser during the distillation of the sulphur solution; but it is closed at the termination, before opening the still to remove the sulphur.

At the commencement of each fresh operation of distillation of the sulphur solution, after the first operation has been completed, and before charging the still from the supply-cistern, the incondensable mixture of bisulphide-of-carbon vapor and atmospheric air is permitted to flow from the gas-holder, by means of a pipe passing nearly to the bottom of the still, in quantity sufficient to float out all the atmospheric air and replace it with air saturated with bisulphide of carbon, the great density of the mixture permitting this to be done with facility. When the distillation has commenced this saturated air finds its way back again into the gas-holder ready for another operation. Or, the air in the still may be displaced by steam, which, on condensing, would permit the entry of the bisulphide-of-carbon solution to be evaporated, and thus dispense with the use of the gas-holder for this purpose; but the employment of a gas-holder is better, because it prevents the entry of air during the process of distillation.

In order to raise the bisulphide of carbon from the receivers to the extractor, I close the receivers hermetically, and maintain them always quite filled with water, which also eliminates the air-spaces. Small overflow-cocks at their tops permit the water to flow out in proportion as it is displaced by the bisulphide of carbon. Pipes for the passage of the bisulphide of carbon from the receivers to the extractors pass water-tight through the tops of the receivers to nearly their bottoms, and the external ends of the pipes are connected with the extractor.

The flow of the bisulphide of carbon through the pipes is controlled by means of cocks. Water can be admitted at the top of the receivers by means of cocks or valves attached to a water-pipe, conveying the water under sufficient pressure to force the bisulphide of carbon from the bottom of the receivers up the pipes into the extractor, the water acting as a liquid piston. I thus force the bisulphide of carbon to a higher level without any mechanical appliances, such as pumps, &c., in direct contact with the bisulphide of carbon, and so avoid loss by leakage and a complicity of joints, which is most desirable in working with bisulphide of carbon. When spent oxide of iron is the substance under treatment I find it necessary to use an agitator in the receptacle, for although the process of lixiviation in beds by percolation can be effected on the small scale in the laboratory, yet on the large scale I find such an operation to be impracticable, owing to the material being liable to cohere or become consolidated into a block impervious to the bisulphide of carbon. The particles being cemented together by the sulphur, I employ an agitator, consisting of arms or blades turning on an axis, and made to work in the receptacle by any convenient means. I introduce into the receptacle a quantity of bisulphide of carbon equal to twice the weight of the oxide under treatment, taking care that such introduction of the bisulphide of carbon does not occupy more than a few minutes, which, by the system of raising the bisulphide of carbon herein described, is readily effected, care having been taken to have the pipes from the receiver sufficiently large. Having displaced the air, as hereinbefore described, and closed the air-cock at the top of the extractor, I then agitate the contents, so as quickly to effect the complete solution of the sulphur, which effected there is then no tendency in the material to become consolidated.

Another modification is sometimes required to remove the solution of sulphur from the residuum of the spent oxide when the material operated on consists to any considerable extent of fine particles, because, on then attempting to filter off the solution of sulphur, the pores of the filter soon become filled with the finer particles, and the process becomes ineffectual. Numerous experiments have been tried with different textile fabrics as a filtering medium, but without any advantage, as the pores in all become speedily choked.

I will now explain a method of working and forming a filter which I have found to answer the purpose in a very effectual manner. The principles upon which it is founded are the following:

First, when bodies of different sizes, but of the same or nearly the same specific gravity, are permitted to sink in a fluid of lesser gravity, the larger masses sink faster than the smaller, because they present less surface to the resistance of the fluid in proportion to their weight, and therefore the bodies will arrange themselves in the order of their respective sizes, the larger being at the bottom.

Secondly, it is well known that such an arrangement of solid matter is the best for the formation of a filter-bed. Now, in order to form such a filter-bed in the extractor, I so agitate the contents thereof that the whole of the solid matter may be brought into a state of suspension in the fluid. I then suddenly stop the agitation and permit the solid matter to subside for about thirty minutes. Under these circumstances the residuum in the extractor (which usually consists of particles from the size of a pea, or larger, to that of a fine, impalpable powder) arranges itself in the best condition for filtration. On then opening the cock under the filtering-bottom the solution of sulphur filters off without any difficulty, and very quickly. The filter should also be similarly formed from the residuum insoluble in the bisulphide of carbon before forcing out the subsequent washings.

By this treatment, after the washings have been removed, the evaporation of the bisulphide of carbon from the residuum by the direct injection of steam at the top of the extractor is rendered practicable, which has not been the case hitherto. The reason of this is, first, because the material so deposited from a state of suspension in the fluid is in the most porous possible arrangement, which, therefore, admits of the free passage of the steam through the material; and, secondly, because at the termination of the process of filtration a considerable portion of the liquid (which would be retained in the interspaces between the particles of the residuum by capillary attraction if the liquid had been allowed to run away by gravitation solely) is forced out by the expansion of the bisulphide-of-carbon vapor, which, under tension, had been the means of effecting the filtration, as already described. With these modifications the separation of the sulphur from spent oxide of iron is quickly and completely effected.

In case the spent oxide of iron should contain too little of the coarser particles, I find it advisable to mix it with spent oxide containing a greater proportion, or with some inactive material of such a specific gravity, size, and shape as will confer the necessary porosity; but generally the material requires no such admixture.

These improvements, applicable to the treatment of spent oxide, are also of value in treating substances such as some descriptions of sulphur ore, which, on being crushed for the purpose of separating the sulphur by the process, produce much finely divided mineral matter, and should be adopted when the process of filtration is difficult.

In order that my said invention may be most fully understood and readily carried into effect, I will proceed to describe the drawings hereunto annexed, which show apparatus designed more particularly for the treatment of spent oxide by means of bisulphide of carbon.

Figure 1 is an elevation, partly in section, of the apparatus, omitting the condensers and gasometer, which parts are shown separately in elevation, partly in section, at Fig. 2. Fig. 3 is a plan, also partly in section, of the apparatus, omitting the stills, which are shown separately in plan at Fig. 4.

$a\ a$ are a pair of extractors. They are cylinders of a convenient size, say eight feet in diameter, so constructed as to be safe up to a moderate pressure, say twenty pounds to the inch, (although so high a pressure is never required,) and they should also be able to resist the atmospheric pressure when there is a vacuum within. There is a man-hole at $a^1$ in the top of the cylinder, and another at $a^2$ in the bottom. These man-holes and others used in the apparatus are closed with covers, which are screwed down against a face, and the joint is made vapor-tight by means of flour paste applied with a brush to the surfaces which come into contact; or a strip of dough made of linseed-meal will also make a sound joint, and is better in cases where the metal-work is not so true as it should be. The lower part of the side of the extractor is steam-jacketed at $a^3$, and the jacket has a safety-valve upon it at $a^4$. $a^5$ is a wooden grating at the bottom of the extractor. It has an opening in it at $a^{13}$, corresponding with the bottom man-hole. Over the grating $a^5$ a coarse linen cloth, $a^6$, is laid. It has a gasket sewed around its edge, and this is slightly calked into the crevice between the edge of the grating and the side of the extractor. The cloth does not cover the man-hole, and here it is also made to fit close by means of a gasket. $a^7$ is a vertical axis within the extractor, and passing out through a stuffing-box at the top. This stuffing-box I pack with cotton, and I lubricate it with soft soap. Upon the axis $a^7$ are curved arms $a^8$, which, when the axis revolves, pass over and close to the surface of the filter-cloth, stirring up the material resting upon it. $a^9$ is a beveled wheel fixed on the top of the axis $a^7$, and $a^{10}$ is a pinion gearing with it, the axis of which pinion is driven by the steam-engine $a^{11}$. The exhaust steam of the engine is passed into the steam-jackets, and aids in heating the vessels. $a^{12}$ is a mercurial pressure-gage inserted into the top of the extractor, and capable of showing the pressure up to, say, thirty inches of mercury.

The spent oxide, having been first thoroughly dried and powdered, (for any moisture interferes seriously with the action of the solvent,) is placed in the extractor so as to rest upon the filter-cloth. The man-hole is then closed down air-tight, and bisulphide of carbon is drawn from a reservoir, hereinafter described, into the extractor through the pipe $b$. I prefer to use twenty gallons of bisulphide for each hundred-weight of the charge of dry material, and the two together should about three-quarters fill the extractor. The steam is then admitted into the jacket, and the engine is set slowly to work, turning the agitator and mixing the charge, the air-pipe $c$ being at this time left open. Vapor is soon produced, and being much denser than air, and the heat being carefully applied, it mixes with it but slightly, and by far the greater part of the air is displaced, and escapes by the air-pipe $c$ before the bisulphide vapor commences to come over. As soon as this vapor issues at the mouth of the air-pipe the pipe is closed by the cock upon it. If it be thought worth while a small condensing-worm may be fitted at the end of the air-pipe, to prevent, for the most part, the trifling loss of bisulphide vapor which otherwise takes place. After the air-cock has been closed the heat is continued until a pressure of from five to ten inches of mercury is attained, and the speed of the agitator is increased until it is sufficient to keep the whole, or nearly the whole, of the solid matter suspended in the solvent. At this time, say about one-quarter of an hour from the commencement of the operation of agitation, the agitator is stopped, and the pressure is not further increased. The solid material then deposits and forms a graduated filter-bed, coarse at the bottom, and becoming finer and finer in successive layers upward. This will be sufficiently accomplished in about thirty minutes, and then the cock $d'$ on the pipe $d$ is opened, and the solution of sulphur is forced out by the pressure of the vapor through the filter into the receiver $e$, hereinafter described. This having been accomplished, a further quantity of bisulphide of carbon, equal to one-half of that first employed, is admitted into the extractor as the vapor therein condenses, and without opening the air-cock. The operation is now repeated, except that the washings are not drawn into the sulphur-solution receiver $e$; but the spirit is made to return by the same pipe, $b$, by which it entered, and is passed into a separate vessel, hereinafter described, provided for the purpose. Steam is next admitted at the top of the extractor by the pipe $f$, for the purpose of vaporizing the remaining solvent, and forcing out the vapor by the pipe $g$, which leads to a condenser, hereinafter described. This having been done the extractor is opened, a truck, $h$, is run under the bottom man-hole, and, the agitator being set to work, the spent material is rapidly discharged and conveyed away. The filter-cloth, which is now moist, is removed; it is replaced with a dry one, and then all is ready for working another charge.

The receiver for sulphur solution $e$ is an iron tank, open at the top. It contains the solution, and a few inches of water standing upon its surface to prevent evaporation. The pipe $d$, by which the solution is admitted, passes down a larger pipe, $e^1$, nearly to the bottom of the tank. This is to prevent any air-bubbles entering with the liquid rising through the water in the tank, as such air would carry up with it globules of solvent, and so a sensible loss would result. The solution stands in the pipe $e^1$, with water over it. Any globules of bisulphide carried up by the air through the water, being confined within a narrow space, coalesce and then sink again. There is, consequently, but very slight loss by evaporation at the surface. $e^2$ $e^2$ are indicating-floats, showing the amount of sulphur solution in the tank. $e^3$ is the cock by which the sulphur solution is drawn off into the stills to be distilled. $i$ $i$ are the stills. They are closed cylinders, similar to the extractors, with man-holes at the bottom. They have double bottoms, and steam is admitted between the two by the pipe $k$, which also serves to supply steam to the jackets of the extractors, and to the steam-engines, which work the stirrers in these vessels, and also in the stills. The stirrer in each still consists of a vertical axis, $i^1$, with arms $i^2$ $i^2$ upon it. One of the arms is inclined, to plow up the sulphur, and prevent it forming a cake at the bottom of the still, and is so set as to keep the bottom quite free from deposit. The other is curved, so as to act more efficiently to discharge the sulphur at the end of the operation when the man-hole at the bottom is open.

The axes of the stirrers in the stills are carried and driven in the same way as those in the extractors, and $i^3$ is the steam-engine by which they are actuated; it exhaust into the spaces at the bottoms of the stills. $i^4$ are safety-valves on these steam-spaces. $i^5$ are pipes by which the condensed water is drawn off.

The distilling operation is conducted in the following manner: The still having been closed at the end of the last operation of distillation, the air is expelled from it through the air-pipe $i^6$, which is left open at the end. This is done by admitting an incondensable mixture of bisulphide vapor and air, which is kept stored in a gas-holder, $l$, and the gaseous mixture is led into the still by the pipe $l^1$, and it is caused to flow gently by removing some of the counterpoise-weights $l^2$ of the gas-holder. As soon as the air is expelled the air-cock is closed, and the counterpoise-weights are restored. The still is then about one-half filled with sulphur solution by opening the cock $e^3$. The heat is then applied, and the pipe $i^7$, leading from the still-head to the condenser $m$, is opened. The evaporation is carried on with care, to avoid priming into the condenser, by the aid of the mercury-gage $i^8$, and observation through the sight-hole $i^9$, which is glazed with talc. When the sulphur begins to be deposited the agitator is turned slowly to keep the deposited sulphur in a granular state, and especially toward the end of the operation it is kept constantly at work, and its speed is then increased to prevent the formation of a non-conducting cake upon the still-bottom. When the process is complete and bisulphide vapor is no longer generated, steam is blown into the still by opening a cock on the branch $k'$ of the steam-pipe, so as effectually to separate the remaining solvent from the sulphur, and to sweep forward the vapor in the still into the condenser. The connection with the condenser is then closed, and the still is opened. A truck is run beneath it, and the agitator being again set to work, the sulphur is rapidly discharged into the truck. The condenser $m$, into which, at the upper end, the bisulphide vapor passes, is constructed like a tubular boiler. There is a vapor-space at each end, and these are connected by a number of small iron tubes, which are surrounded with cold water admitted by the water-pipe $n$, and drawn off into a drain by the pipe $o$. The condensed bisulphide runs out at the bottom of the condenser by the pipe $m^1$, which branches into two pipes, $m^2$ and $m^3$. The pipe $m^2$ leads into the pure-spirit receiver $p$, hereinafter described, while the pipe $m^3$ passes to the top of a second condenser, $q$, consisting of a rectangular coil, $q^1$, of iron pipes of large diameter contained in a water-cistern, $q^2$, and a stream of cold water is admitted constantly at the bottom of this cistern by a pipe, $q^3$, and drawn off at the top by an overflow, $q^4$, which leads into a drain. The uncondensed bisulphide, together with the incondensable mixture of vapor and air, is led away from the bottom of this condenser by the pipe $q^5$. By a branch, $q^6$, from this pipe the gaseous mixture enters the gas-holder $l$, while the liquid flows into the pure-spirit receiver $p$. The pure-spirit receiver $p$ and the washings-receiver $r$ are two similar cylindrical vessels closed at the top, and provided with man-holes. The bisulphide is admitted to them and drawn off from them by the pipes $p^1$ and $r^1$, which both connect with the rising pipe $b$, leading to the extractors. The spirit is, when required, forced up into the extractors by admitting water, under pressure, at the top of the receiver by one or other of the pipes $p^2 r^2$, and when it is desired that spirit should descend from the extractors into the washings-receiver it is permitted to do so by opening the cocks upon the spirit-pipe $b$, and also the cock $r^3$, which allows water to flow out from the top of the washings-receiver into the drain. In a similar way, when the pure-spirit receiver is receiving spirit from the condenser, water is allowed to escape at the top of the receiver by the cock $p^3$.

The gas holder is clearly shown in the drawings, and as it is of ordinary construction, no further description of it is required. The bisulphide gas, as it may be called, enters by the pipe $q^5$, and is drawn off for use by the pipe $l^1$. I prefer to employ bisulphide of carbon as the solvent; nevertheless light hydrocarbon oil may be employed. These oils being lighter than water, some obvious modifications of the apparatus will be required; and, further, for treatment with hydrocarbons of light gravity, as described in such cases where, on cooling, a considerable deposition of sulphur would take place, it is necessary to avoid the radiation of heat from the eduction-cock and pipe from the extractor by covering them externally with a suitable non-conducting material, or by jacketing them, so as to afford the facility of keeping them warm, where required, by means of steam or liquid bath. And in such cases it is further necessary either to run the solution of sulphur from the extractor directly into the still, or else to provide some means of maintaining the sulphur solution in the supply-cistern at a temperature above that at which the sulphur would be deposited.

Having thus described the nature of my said invention, and the manner of performing the same, I would here remark that I do not claim the separation of sulphur by employing the bisulphide of carbon as a solvent in a closed apparatus arranged for the purpose, and separating the products by distillation, which has frequently been proposed, but not hitherto successfully worked; but

What I claim is—

1. The hereinbefore-described improvement in the art of separating free sulphur from substances with which it is mixed; which improvement consists in mixing the sulphur-bearing substance in a dry state with bisulphide of carbon in a close vessel or extractor, heating the mixture to the boiling-point, agitating it, stopping the agitation, and allowing the granular residuum to form a filter, through which the liquid contents of the extractor are forced by the pressure of vapor generated in the extractor itself.

2. The hereinbefore-described improvement in the art of separating free sulphur from substances with which it is mixed; which improvement consists in mixing a charge of sulphur-bearing substances with bisulphide of carbon in a closed vessel or extractor, heating, agitating, filtering, and discharging the liquid contents; then subsequently admitting a fresh charge of bisulphide of carbon into the extractor, mixing it by agitation with the residuum remaining therein, allowing the contents of the extractor to subside; then discharging the liquid contents into a receiver separate from the first one, and applying the resultant product to a fresh charge of sulphur-bearing substance, thus securing the strongest practicable solution for evaporation.

3. The hereinbefore-described improvement in the art of separating free sulphur from substances with which it is mixed; which improvement consists in mixing the sulphur-bearing substance in a dry state with bisulphide of carbon in a closed vessel or extractor, provided with an escape-pipe leading to a condenser, and a return-pipe leading from the condenser through a gas-holder to the extractor, raising the temperature of the mixture in the extractor to a boiling-point, whereby that portion of the bisulphide-of-carbon vapor driven from the extractor during the first stage of the process may be saved and returned to the extractor after the insertion of a fresh charge of sulphur-bearing substance.

4. The hereinbefore-described improvement in the art of separating free sulphur from substances with which it is mixed; which improvement consists in discharging the washings from the extractor through a pipe inclosed in a larger one, both extending nearly to the bottom of a receiver, and below the surface of water contained therein, whereby any globules of bisulphide-of-carbon vapors carried down through the pipe in the form of vapor will rise up between the outer and inner pipes, and be saved.

SAML. H. JOHNSON.

Witnesses:
WILMER M. HARRIS,
JNO. DEAN,
Both of No. 17 Gracechurch Street, London.